US012614857B2

(12) United States Patent
Jargalsaikhan et al.

(10) Patent No.: US 12,614,857 B2
(45) Date of Patent: Apr. 28, 2026

(54) MULTIBAND BASE STATION ANTENNA HAVING IMPROVED BEAMWIDTH

(71) Applicant: ACE TECHNOLOGIES CORPORATION, Incheon (KR)

(72) Inventors: Nyambayar Jargalsaikhan, Incheon (KR); Ho-Yong Kim, Incheon (KR); Jeong Geun Park, Daejeon (KR); Eun Suk Yang, Incheon (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 167 days.

(21) Appl. No.: 18/748,729

(22) Filed: Jun. 20, 2024

(65) Prior Publication Data

US 2024/0339761 A1 Oct. 10, 2024

Related U.S. Application Data

(63) Continuation of application No. PCT/KR2022/095147, filed on Oct. 19, 2022.

(30) Foreign Application Priority Data

Dec. 23, 2021 (KR) ........................ 10-2021-0185743

(51) Int. Cl.
*H01Q 21/26* (2006.01)
*H01Q 1/24* (2006.01)
(Continued)

(52) U.S. Cl.
CPC ............. *H01Q 15/14* (2013.01); *H01Q 1/246* (2013.01); *H01Q 1/523* (2013.01); *H01Q 5/42* (2015.01); *H01Q 21/26* (2013.01)

(58) Field of Classification Search
CPC .......... H01Q 1/246; H01Q 1/523; H01Q 5/42; H01Q 21/26
See application file for complete search history.

(56) References Cited

U.S. PATENT DOCUMENTS

2020/0083613 A1 3/2020 Liu et al.
2020/0343629 A1 10/2020 Kim et al.
(Continued)

FOREIGN PATENT DOCUMENTS

CN 205509015 U 8/2016
CN 109494460 A 3/2019
(Continued)

OTHER PUBLICATIONS

International Search Report for PCT International Application No. PCT/KR2022/095147 issued on Feb. 20, 2023.
(Continued)

*Primary Examiner* — Daniel Munoz

(57) ABSTRACT

A multiband base station antenna having improved beamwidth is disclosed. The disclosed antenna comprises: a reflective plate; a plurality of first low-band radiators arranged on the reflective plate along a first column; a plurality of second low-band radiators arranged on the reflective plate along a second column, which is parallel to the first column and is spaced from the first column; a plurality of high-band radiators arranged on the reflective plate; and a plurality of vertical choke members arranged, between the first column and the second column, in the direction parallel to that of the first column and the second column, wherein the vertical choke members comprise a first substrate, a meander line is formed on the first substrate, and a metal line is formed under the first substrate. According to the disclosed antenna, beamwidth distortion of each radiator, caused by interference between the radiators, can be prevented, and proper isolation characteristics between the radiators can be ensured.

13 Claims, 12 Drawing Sheets

(51) Int. Cl.

| | |
|---|---|
| ***H01Q 1/52*** | (2006.01) |
| ***H01Q 5/42*** | (2015.01) |
| ***H01Q 15/14*** | (2006.01) |

(56) References Cited

U.S. PATENT DOCUMENTS

| | | | | |
|---|---|---|---|---|
| 2021/0391647 | A1* | 12/2021 | Guo | H01Q 1/246 |
| 2024/0063558 | A1* | 2/2024 | Lv | H01Q 25/001 |
| 2024/0213657 | A1* | 6/2024 | Li | H01Q 21/061 |

FOREIGN PATENT DOCUMENTS

| | | | |
|---|---|---|---|
| CN | 112886278 | A | 6/2021 |
| CN | 113270719 | A | 8/2021 |
| KR | 10-2010-0019788 | A | 2/2010 |
| KR | 10-2011-0041785 | A | 4/2011 |
| KR | 10-2016-0050725 | A | 5/2016 |
| KR | 10-2019-0027097 | A | 3/2019 |
| KR | 10-2019-0086130 | A | 7/2019 |

OTHER PUBLICATIONS

Written Opinion of the International Searching Authoriity of PCT/KR2022/095147 issued on Feb. 20, 2023.

* cited by examiner

500

MULTIBAND BASE STATION ANTENNA HAVING IMPROVED BEAMWIDTH

CROSS-REFERENCE TO RELATED APPLICATION

This application is a continuation of pending PCT International Application No. PCT/KR2022/095147, which was filed on Oct. 19, 2022, and which claims priority to Korean Patent Application No. 10-2021-0185743 filed in the Korean Intellectual Property Office on Dec. 23, 2021. The entire contents of the aforementioned patent applications are incorporated herein by reference.

BACKGROUND

1. Technical Field

The present disclosure relates to a multi-band base station antenna, and more particularly, to a multi-band base station antenna having an improved beamwidth.

2. Description of the Related Art

Recently, the demand for 5G communication systems with high transmission speeds and low communication delays is rapidly increasing, and various ways to operate 5G communication networks efficiently along with existing LTE communication networks are being reviewed.

As the 5G band is incorporated into the communications band, the frequency band required for base station antennas is gradually increasing. In addition to meeting these multi-band characteristics, miniaturization of the antenna is also required.

However, due to radiators placed inside the miniaturized antenna, strong interference occurs between the radiators, and this interference causes problems in which the beam width is distorted and the isolation characteristics are deteriorated.

In order to satisfy the multi-band characteristics, radiators of various bands are arranged, and the arrangement spacing between each radiator is inevitably narrowed to meet the miniaturization requirement. There were problems that radiators arranged at narrow intervals inevitably had deteriorated isolation characteristics, and that the beam width also widened due to adjacent radiators. The deterioration of the isolation characteristics and the beam width results in deterioration of the quality of communication services.

SUMMARY OF THE INVENTION

An object of the present disclosure is to propose a multi-band base station antenna that can prevent distortion of the beam width of each radiator due to interference between radiators.

Another object of the present disclosure is to propose a multi-band base station antenna that can secure good isolation characteristics between radiators.

According to one aspect of the present disclosure to achieve the above-mentioned objects, a multi-band base station antenna is provided, the antenna comprising: a reflective plate; a plurality of first low-band radiators arranged on the reflective plate along a first column; a plurality of second low-band radiators arranged on the reflective plate along a second column, which is parallel to the first column and is spaced apart from the first column; a plurality of high-band radiators arranged on the reflective plate; and a plurality of vertical choke members arranged, between the first column and the second column, in the direction parallel to that of the first column and the second column, wherein the vertical choke members comprise a first substrate, a meander line is formed on the first substrate, and a metal line is formed under the first substrate.

The multi-band base station antenna may further include a plurality of horizontal choke members arranged in the direction perpendicular to that of the vertical choke member.

The horizontal choke members may comprise a second substrate, and a meander line may be formed on the second substrate.

The vertical choke member and the horizontal choke member may be arranged at a position equal to or higher than that of the low-band radiators.

The vertical choke member and the horizontal choke member may be arranged for each pair of the first low-band radiator and the second low-band radiator.

The longitudinal end of the vertical choke member may be arranged in contact with or adjacent to the central portion of the horizontal choke member, forming a ‘T’ shape.

According to another aspect of the present disclosure, a multi-band base station antenna is provided, the antenna comprising: a reflective plate; a plurality of first radiators arranged on the reflective plate along a first column; a plurality of second radiators arranged on the reflective plate along a second column, which is parallel to the first column and is spaced apart from the first column; a plurality of vertical choke members arranged, between the first column and the second column, in a direction parallel to that of the first column and the second column; and a plurality of horizontal choke members arranged in a direction perpendicular to the plurality of vertical choke members.

The multi-band base station antenna of the present disclosure has the advantage of preventing distortion of the beam width of each radiator due to interference between radiators.

In addition, the multi-band base station antenna of the present disclosure has the advantage of securing good isolation characteristics between radiators.

DETAILED DESCRIPTION OF THE INVENTION

Figure 1:
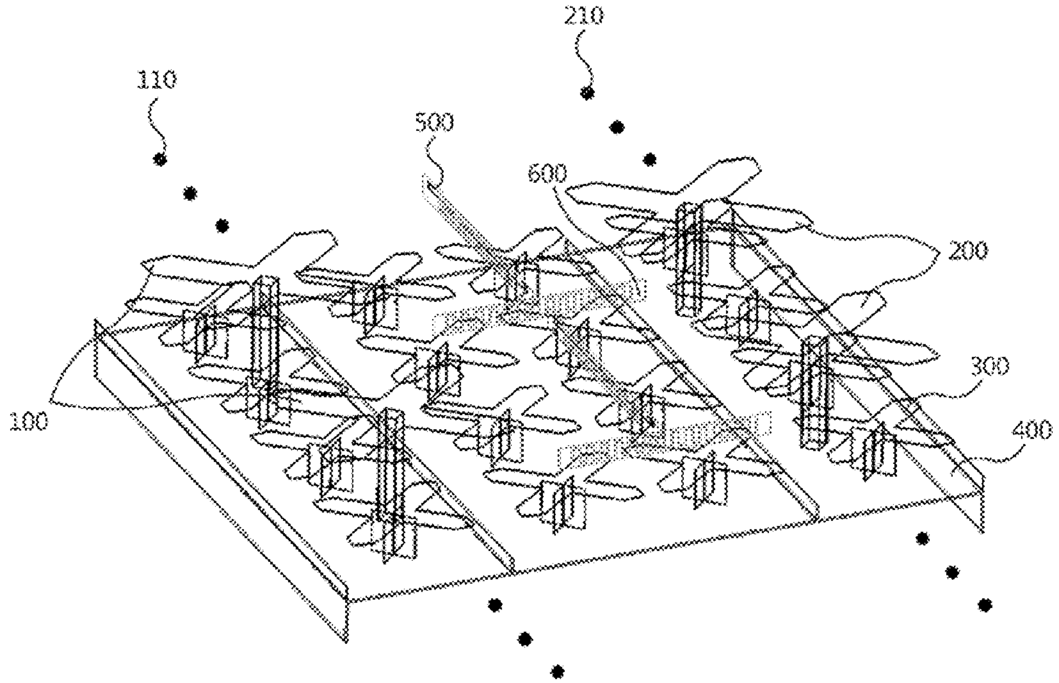
FIG. 1 is a diagram showing the structure of a multi-band base station antenna according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
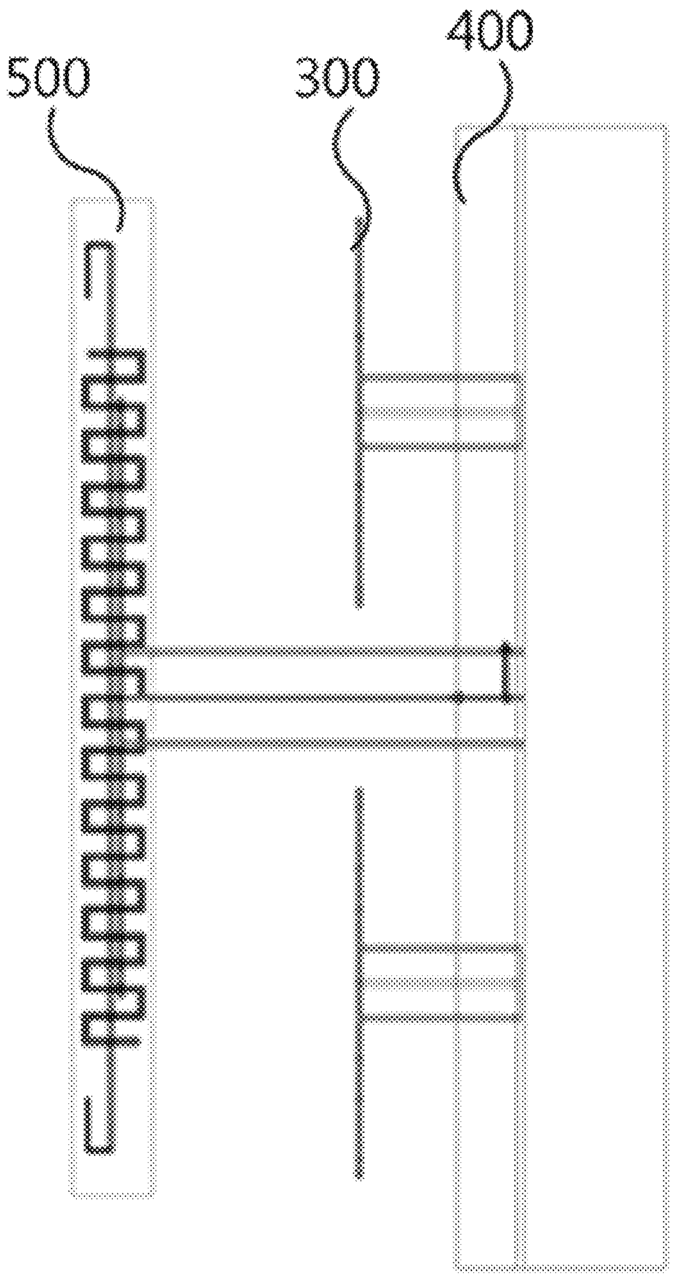
FIG. 2 is a diagram showing a first partial cross-section of a multi-band base station antenna according to an embodiment of the present disclosure.
Figure 3:
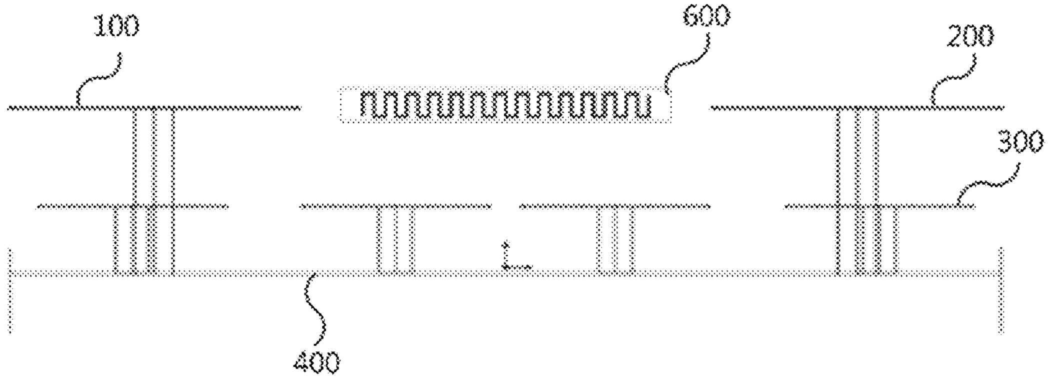
FIG. 3 is a diagram showing a second partial cross-section of a multi-band base station antenna according to an embodiment of the present disclosure.

FIG. 1 is a diagram showing the structure of a multi-band base station antenna according to an embodiment of the present disclosure, FIG. 2 is a diagram showing a first partial cross-section of a multi-band base station antenna according to an embodiment of the present disclosure, and FIG. 3 is a diagram showing a second partial cross-section of a multi-band base station antenna according to an embodiment of the present disclosure.

Referring to FIG. 1, the multi-band base station antenna according to an embodiment of the present disclosure comprises a plurality of first low-band radiators 100, a plurality of second low-band radiators 200, a plurality of high-band radiators 300, and a reflective plate 400.

The diagram shown in FIG. 1 is a diagram showing a portion of a multi-band base station antenna for convenience of explanation, and the structure shown in FIG. 1 may be repeatedly extended.

The plurality of first low-band radiators 100 are arranged along the first column 110, and the plurality of second low-band radiators 200 are arranged along the second column 210. FIG. 1 shows a case where two first low-band radiators 100 are arranged along the first column 110 and two second low-band radiators 200 are arranged along the second column 210. However, since the diagram of FIG. 1 shows a portion of the antenna, a greater number of first low-band radiators 100 and second low-band radiators 200 may be arranged.

In addition, FIG. 1 shows a case where the low-band radiators 100 and 200 form two columns, but it will be obvious to those skilled in the art that the number of columns of low-band radiators may be changed.

The first low-band radiators 100 and the second low-band radiators 200 are arranged on the reflective plate 400.

The first low-band radiators 100 and the second low-band radiators 200 may have the same shape and size, and emit signals in the same band. The first low-band radiators 100 and the second low-band radiators 200 may be radiators that emit dual polarization of +45 degree polarization and −45 degree polarization.

The first column 110 and the second column 210 are parallel, and the first low-band radiators 100 and second low-band radiators 200 are spaced apart at a preset interval. In recent years, there has been a continued demand for miniaturization of the antenna size, and for miniaturization, the first low-band radiators 100 and the second low-band radiators cannot be sufficiently spaced apart.

When the first low-band radiators 100 and the second low-band radiators 200 are not sufficiently spaced apart, the beam emitted from the first low-band radiators 100 and the beam emitted from the second low-band radiators 200 overlap, and this overlap causes the beam width of each low-band radiator to unintentionally widen.

For example, assume that the beam width when the first low-band radiators 100 and the second low-band radiators 200 emit beams without being influenced by each other is 70 degrees. When the first low-band radiators 100 and the second low-band radiators 200 are not sufficiently spaced apart, the beams of the first low-band radiators 100 and the second low-band radiators 200 overlap, so that the beam width of the first low-band radiators 100 and the second low-band radiators 200 can increase to 90 degrees or more.

Meanwhile, the plurality of high-band radiators 300 are arranged together on the reflective plate 400. Since the size of the radiator is inversely proportional to the frequency at which it emits, the plurality of high-band radiators 300 have a smaller size than the first low-band radiators 100 and the second low-band radiators 200. The high-band radiator 300 may also be an radiator that emits dual polarization of +45 degree polarization and −45 degree polarization.

To prevent beam width distortion of the first low-band radiators 100 and the second low-band radiators 200 and to improve the isolation between the first low-band radiators 100 and the second low-band radiators 200, the multi-band base station antenna of the present disclosure includes a vertical choke member 500 and a horizontal choke member 600.

The vertical choke members 500 are arranged in a direction parallel to the first column 110 and the second column 210, and the horizontal choke members 600 are arranged in a direction perpendicular to the first column 110 and the second column 210. The vertical choke members 500 are preferably disposed at the center of the first column 110 and the second column 210.

According to a preferred embodiment of the present disclosure, the vertical choke members 500 and the horizontal choke members 600 are disposed at a higher position compared to the high-bandwidth radiators 300. FIG. 2 is a partial cross-sectional view of the antenna of the present disclosure viewed from a direction parallel to the column of low-band antennas, and FIG. 3 is a partial cross-sectional view of the antenna of the present disclosure viewed from a direction perpendicular to the column of low-band antennas.

Referring to FIGS. 2 and 3, it can be seen that the vertical choke members 500 and the horizontal choke members 600 are located at a higher position than the high-band radiators 300. The height of the vertical choke members 500 and horizontal choke members 600 is preferably the same as that of the low-band radiators 100, 200, but may be located slightly higher as shown in FIGS. 2 and 3. Meanwhile, it is preferable that the height of the vertical choke members 500 and the height of the horizontal choke members 600 are the same.

Although not shown in FIGS. 1 to 3, a supporter (not shown) supporting the vertical choke members 500 and the horizontal choke members 600 may be disposed on the antenna so that the vertical choke members 500 and the horizontal choke members 600 are located at a higher position than the low-band radiators 100, 200.

Figure 4:
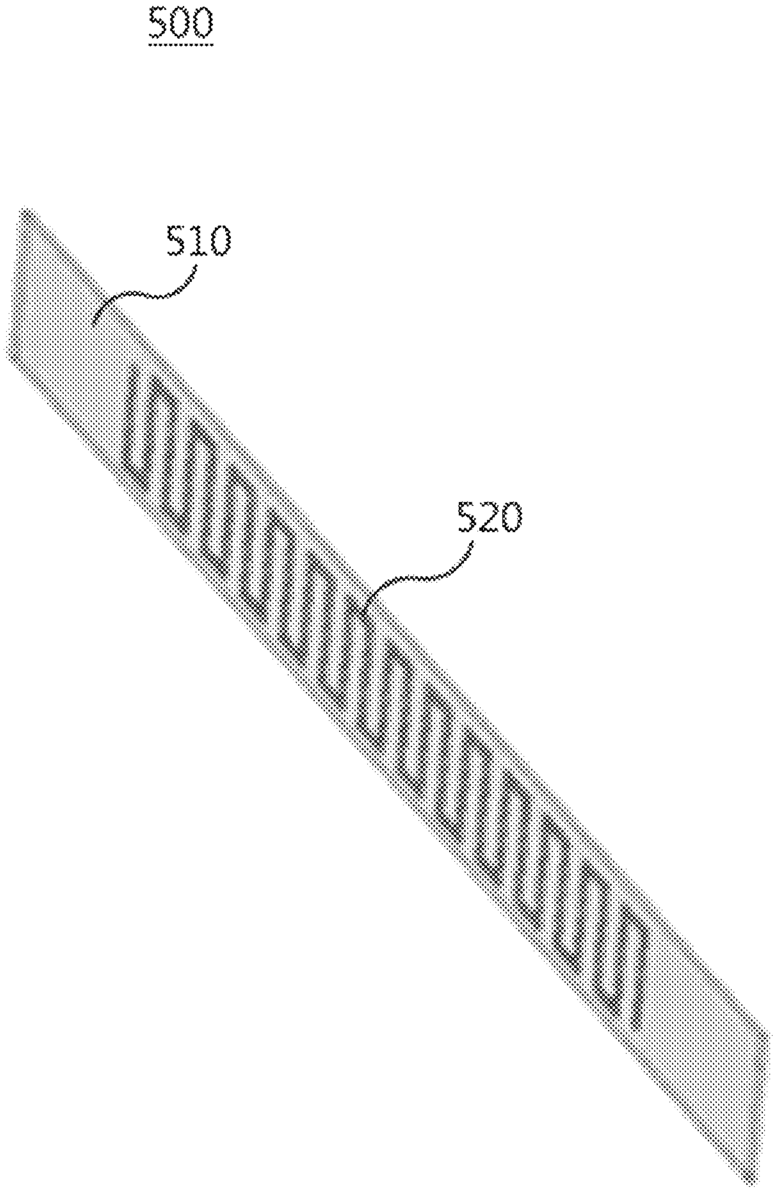
FIG. 4 is a diagram showing the upper surface of a vertical choke member according to an embodiment of the present disclosure.
Figure 5:
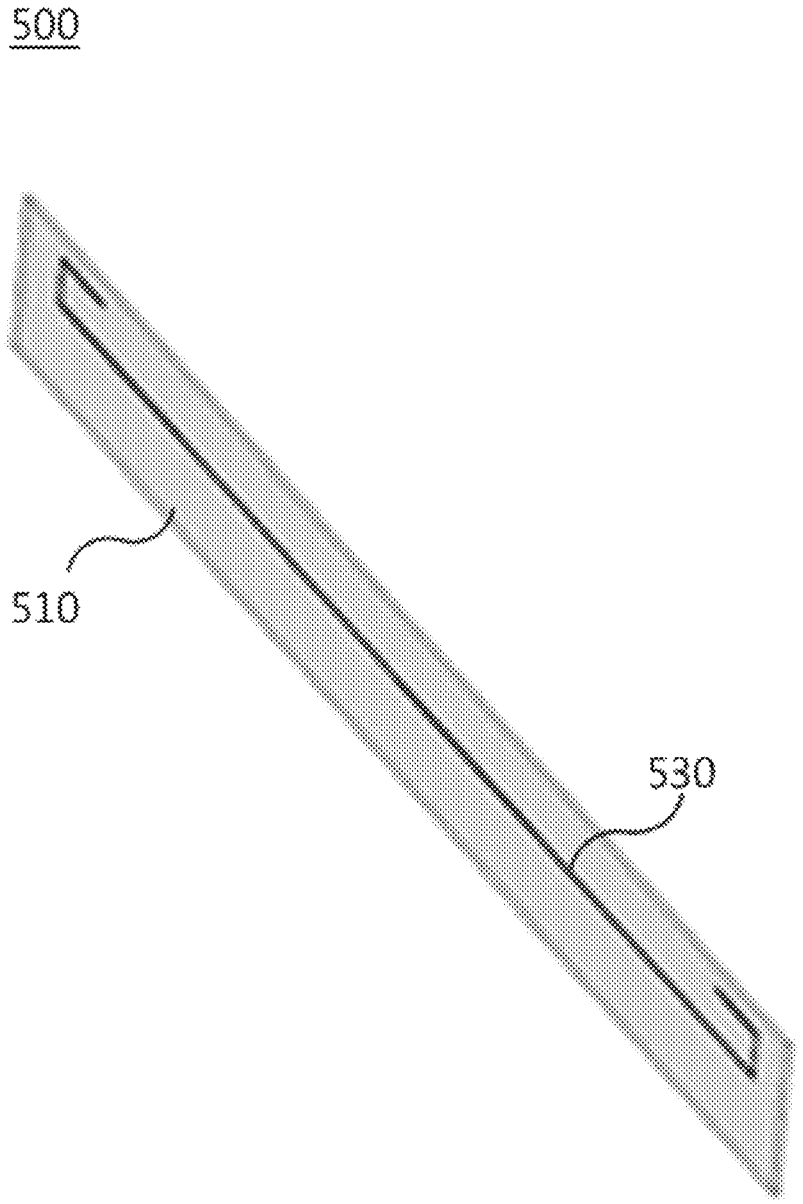
FIG. 5 is a diagram showing the lower surface of a vertical choke member according to an embodiment of the present disclosure.
Figure 6:
FIG. 6 is a diagram showing a meander line and a metal line of a vertical choke member according to an embodiment of the present disclosure.

FIG. 4 is a diagram showing the upper surface of a vertical choke member according to an embodiment of the present disclosure, FIG. 5 is a diagram showing the lower surface of a vertical choke member according to an embodiment of the present disclosure, and FIG. 6 is a diagram showing a meander line and a metal line of a vertical choke member according to an embodiment of the present disclosure.

Referring to FIG. 4, the body of the vertical choke member is a substrate 510, and a meander line 520 is formed on the upper part of the substrate 510. The meander line 520 is a zigzag-shaped line and the meander line 520 is made of metal.

Referring to FIG. 5, a metal line 530 is formed on the lower part of the substrate 510 of the vertical choke member 500. The metal line is an overall horizontal line and extends in the same direction as the longitudinal direction of the substrate 510. According to one embodiment of the present disclosure, the terminal portion of the metal line 530 may be bent. FIG. 5 shows the terminal portion of the metal line 530 being bent twice. The terminal portion of the metal line 530 may be bent to secure the electrical length of the metal line 530.

Referring to FIG. 6, the metal line 530 and the meander line 520 are shown on the same plane, and the length of the metal line 530 is set to be longer than that of the meander line 520.

A typical choke member of a base station antenna takes the form of a metal plate. This type of choke member in the form of a metal plate can contribute to improving the isolation between radiators, but there is a problem of generating a new resonance in the choke member of the metal plate. In particular, a choke member in the form of a metal plate was not appropriate to prevent the beam width of the first low-band radiators 100 and the second low-band radiators 200 from widening.

The present disclosure proposes a choke member using the substrate 510 as a body to prevent beam overlap of the first low-band radiators 100 and the second low-band radiators 200, and vertical choke members 500 are used in which a meander line 520 is formed on the upper part of the substrate 510 and a horizontal metal line 530 is formed on the lower part of the substrate 510.

Figure 7:
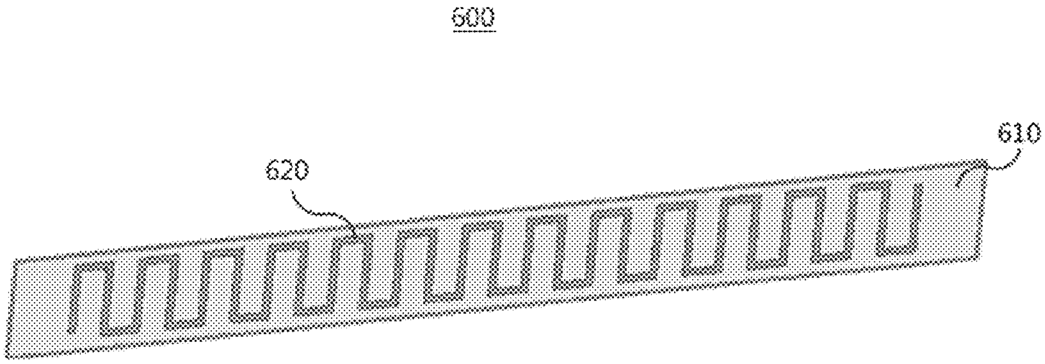
FIG. 7 is a diagram showing the upper surface of a horizontal choke member according to an embodiment of the present disclosure.

FIG. 7 is a diagram showing the upper surface of a horizontal choke member according to an embodiment of the present disclosure.

Referring to FIG. 7, the horizontal choke member 600 also uses a substrate 610 as a body, and a meander line 620 is formed on the upper part of the substrate. Unlike the vertical choke member 500, no separate metal line is formed on the lower part of the substrate 610 of the horizontal choke member 600.

Figure 8:
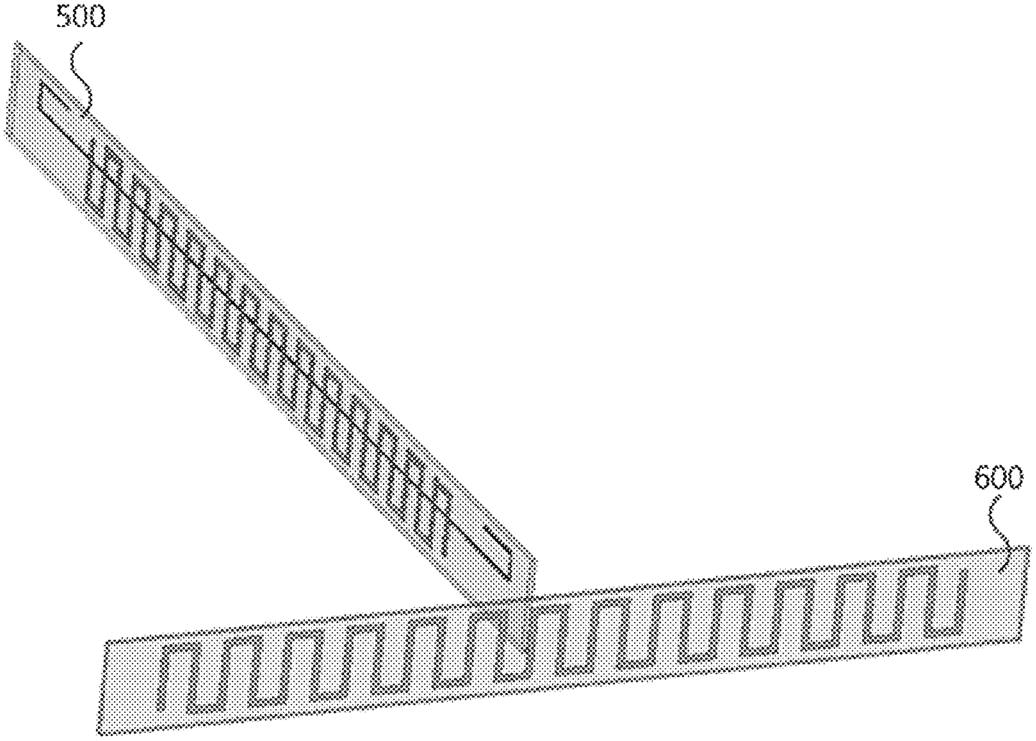
FIG. 8 is a diagram showing the arrangement structure of a vertical choke member and a horizontal choke member according to an embodiment of the present disclosure.

FIG. 8 is a diagram showing the arrangement structure of a vertical choke member and a horizontal choke member according to an embodiment of the present disclosure.

Referring to FIG. 8, a longitudinal end of the vertical choke member 500 is in contact with the central portion of the horizontal choke member 600, so that the vertical choke member 500 and the horizontal choke member 600 may be arranged to form a 'T' shape.

Of course, the longitudinal end of the vertical choke member 500 may be spaced apart from the horizontal choke member 600 without contacting it.

The vertical choke member 500 and the horizontal choke member 600 as shown in FIG. 8 may be formed for each pair of the first low-band radiator 100 and the second low-band radiator 200.

In FIG. 1, two pairs of first and second low-band radiators are shown, and thus two vertical choke members 500 and two horizontal choke members 600 are shown.

If 10 first low-band radiators are arranged in the first column and 10 second low-band radiators are arranged in the second column, 10 vertical choke members and 10 horizontal choke members may be arranged.

In the meander lines 520 and 620 and the metal line 530 formed on the vertical choke member 500 and the horizontal choke member 600, current is induced by beams emitted from adjacent low-band radiators. As the current is induced in the vertical choke member 500 and the horizontal choke member 600, current induced in other adjacent low-band radiators can be minimized, and as a result, it is possible to minimize the overlap of beam widths between adjacent low-band radiators and prevent the beam width of each radiator from widening. In addition, the choke member structure of the present disclosure can contribute to improving the isolation between the first low-band radiators 100 and the second low-band radiators 200.

Meanwhile, FIGS. 1 to 8 show a case where the substrates 510 and 610 of the vertical choke members 500 and vertical choke member 600 are arranged perpendicular to the reflective plate 400. However, depending on required characteristics, the substrates 510 and 610 may be arranged parallel to the reflective plate 400.

Figure 9:
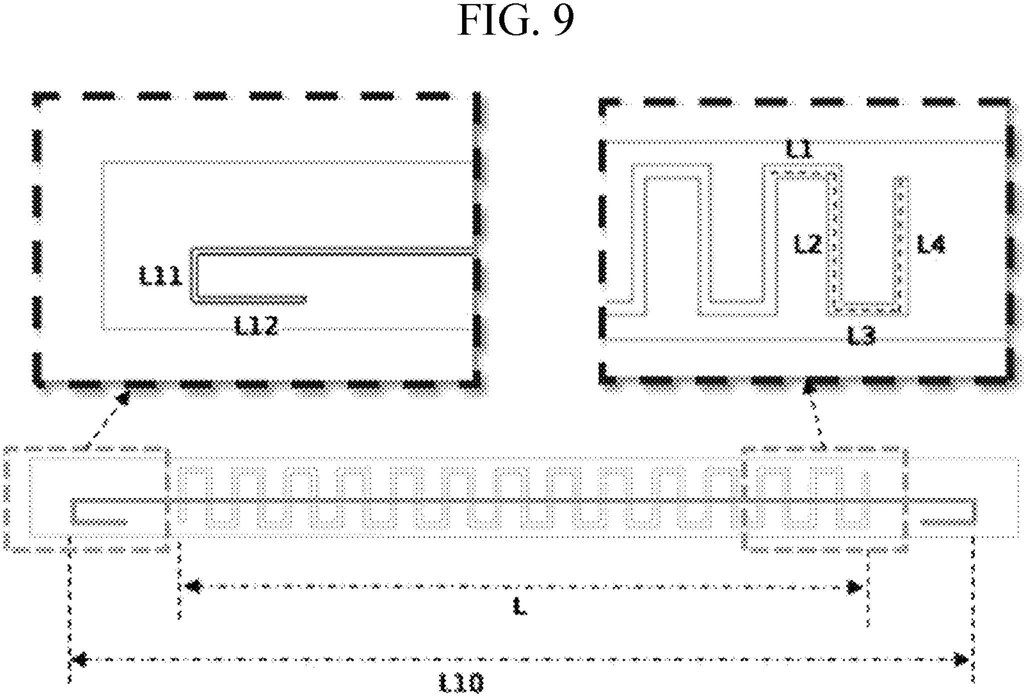
FIG. 9 is a diagram for explaining the length constraints of a meander line and a metal line in an antenna according to an embodiment of the present disclosure.

FIG. 9 is a diagram for explaining the length constraints of a meander line and a metal line in an antenna according to an embodiment of the present disclosure.

According to one embodiment of the present disclosure, L, the total length of the meander line, is preferably set to $0.4192\lambda_c$. Here, $\lambda_c$ means the center wavelength in the low-band radiator operating frequency band. Meanwhile, the length of the horizontal line ($L_1$) among the meander lines is preferably set to $0.01379\lambda_c$, and the length of the vertical line ($L_2$) is preferably set to $0.02758\lambda_c$.

In addition, the total summed length of the meander line can be set to $0.74\lambda_c$. In addition, the total length of the metal line, L10+L11*2+L12*2, may be set to $0.56\lambda_c$.

Figure 10:
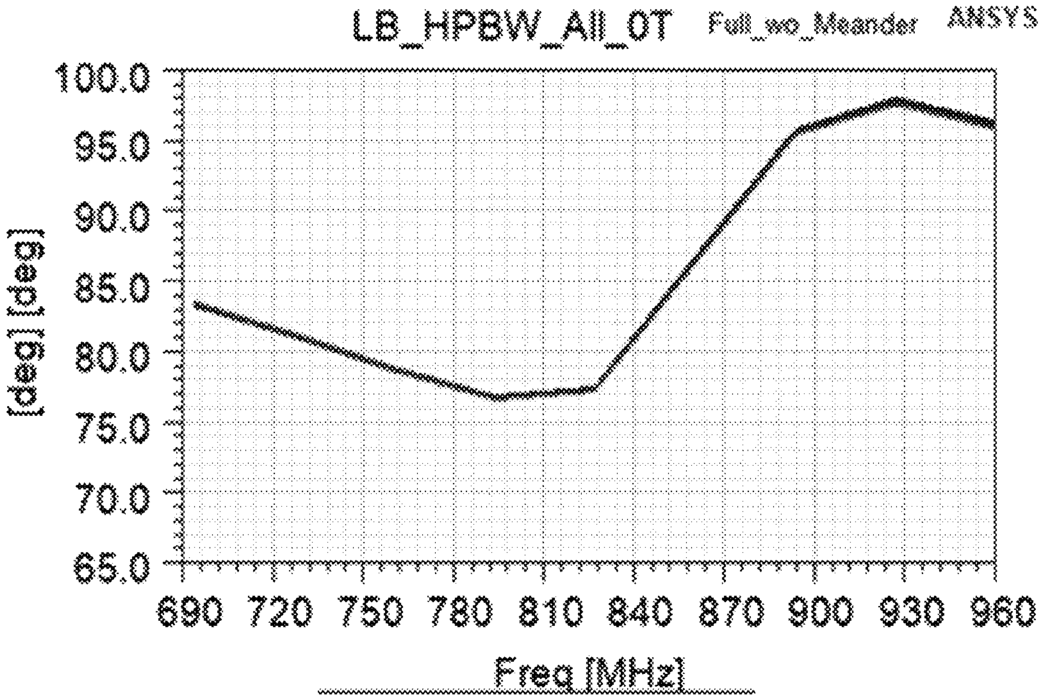
FIG. 10 is a graph showing the beam width of low-band radiators when a horizontal choke member and a vertical choke member are not arranged in a multi-band base station antenna.

FIG. 10 is a graph showing the beam width of low-band radiators when a horizontal choke member and a vertical choke member are not arranged in a multi-band base station antenna.

In FIG. 10, the x-axis is frequency and the y-axis is beamwidth. Referring to FIG. 10, it can be seen that the beam width increases as the frequency of the low-band radiator increases. When the vertical choke member and the horizontal choke member do not exist, it can be seen that the beam width is 75 to 85 degrees in the low band, but the beam width is more than 95 degrees in the high band.

Figure 11:
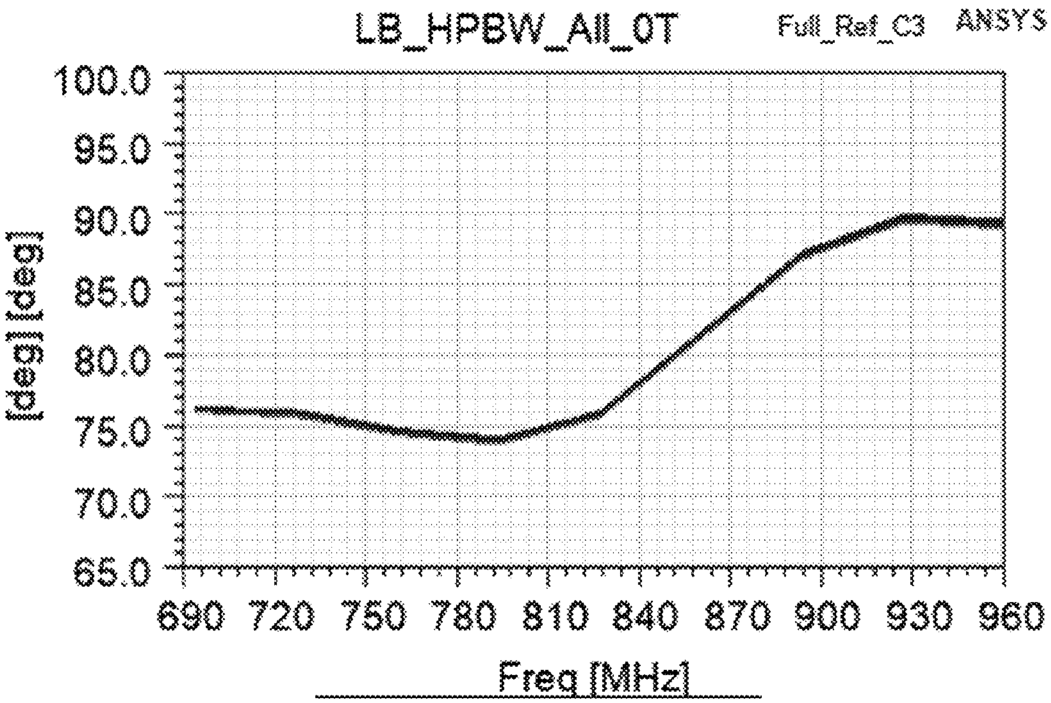
FIG. 11 is a graph showing the beam width of low-band radiators when a vertical choke member with a meander line and a horizontal choke member with a meander line are arranged in a multi-band base station antenna.

FIG. 11 is a graph showing the beam width of low-band radiators when a vertical choke member with a meander line and a horizontal choke member with a meander line are arranged in a multi-band base station antenna.

The graph in FIG. 11 is a graph in which only the meander line is applied to the vertical choke member and the metal line is not applied.

Referring to FIG. 11, it can be seen that the overall beam width is narrowed compared to the case where the vertical choke member and the horizontal choke member are not arranged.

Figure 12:
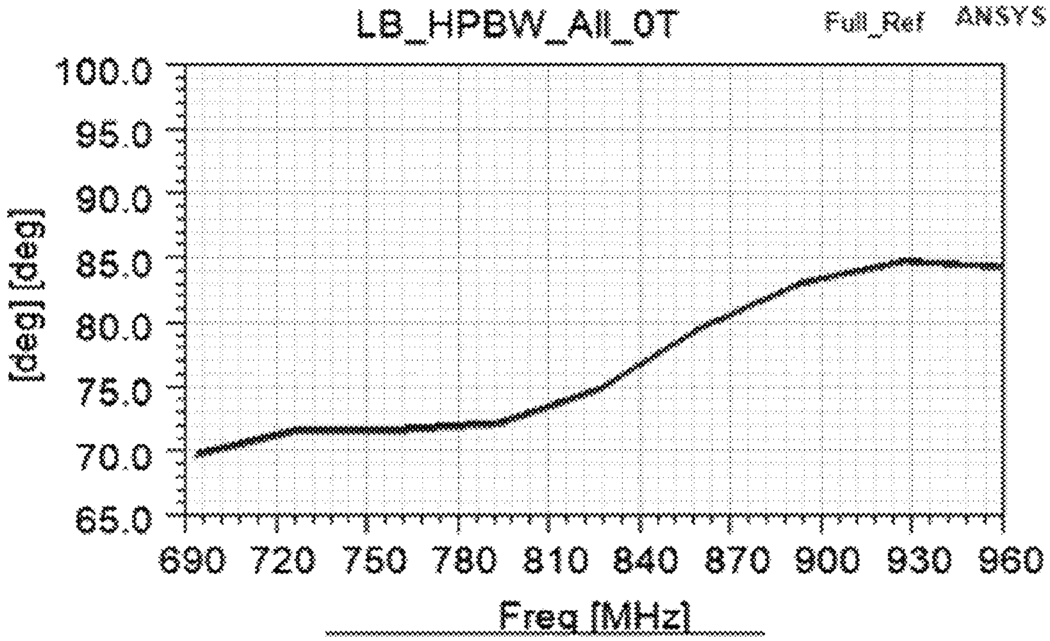
FIG. 12 is a graph showing the beam width of low-band radiators in a multi-band base station antenna to which both vertical and horizontal choke members are applied according to an embodiment of the present disclosure.

FIG. 12 is a graph showing the beam width of low-band radiators in a multi-band base station antenna to which both vertical and horizontal choke members are applied according to an embodiment of the present disclosure.

Referring to FIG. 12, it can be seen that when both the metal line and the meander line are applied to the vertical choke member, the beam width in the low frequency band is maintained at 70 to 75 degrees. In addition, it can be seen that the beam width is maintained below 85 degrees even in the high frequency band.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A multi-band base station antenna, comprising:
a reflective plate;
a plurality of first low-band radiators arranged on the reflective plate along a first column;
a plurality of second low-band radiators arranged on the reflective plate along a second column, which is parallel to the first column and is spaced apart from the first column;
a plurality of high-band radiators arranged on the reflective plate; and
a plurality of vertical choke members arranged, between the first column and the second column, in the direction parallel to that of the first column and the second column,
wherein the vertical choke members comprise a first substrate, a meander line formed on the first substrate, and a metal line formed under the first substrate.

2. The multi-band base station antenna according to claim 1,
wherein the multi-band base station antenna further includes a plurality of horizontal choke members arranged in the direction perpendicular to the vertical choke members.

3. The multi-band base station antenna according to claim 2,
wherein the horizontal choke members comprise a second substrate, and a meander line formed on the second substrate.

4. The multi-band base station antenna according to claim 3,
wherein the vertical choke members and the horizontal choke members are arranged at a position equal to or higher than the height of the low-band radiators.

5. The multi-band base station antenna according to claim 3,
wherein a vertical choke member and a horizontal choke member are arranged for each pair of a first low-band radiator and a second low-band radiator.

6. The multi-band base station antenna according to claim 3,
wherein a longitudinal end of a vertical choke member is arranged in contact with or adjacent to central portion of a horizontal choke member, forming a ‘T’ shape.

7. A multi-band base station antenna, comprising:
a reflective plate;
a plurality of first radiators arranged on the reflective plate along a first column;
a plurality of second radiators arranged on the reflective plate along a second column, which is parallel to the first column and is spaced apart from the first column;
a plurality of vertical choke members arranged, between the first column and the second column, in a direction parallel to the first column and the second column; and
a plurality of horizontal choke members arranged in a direction perpendicular to the plurality of vertical choke members.

8. The multi-band base station antenna according to claim 7,
wherein the vertical choke members comprise a first substrate, a meander line formed on the first substrate, and a metal line formed under the first substrate.

9. The multi-band base station antenna according to claim 8,
wherein the horizontal choke members comprise a second substrate, and a meander line formed on the second substrate.

10. The multi-band base station antenna according to claim 9,
wherein a vertical choke member and a horizontal choke member are arranged for each pair of a first radiator and a second radiator.

11. The multi-band base station antenna according to claim 9,
wherein a longitudinal end of a vertical choke member is arranged in contact with or adjacent to central portion of a horizontal choke member, forming a ‘T’ shape.

12. The multi-band base station antenna according to claim 7,
wherein the vertical choke members and the horizontal choke members are arranged at a position equal to or higher than the height of the first radiators and the second radiators.

13. The multi-band base station antenna according to claim 7,
wherein the vertical choke members or the horizontal choke members are arranged at a position equal to or higher than the height of the first radiators and the second radiators.

* * * * *